Figure 1:
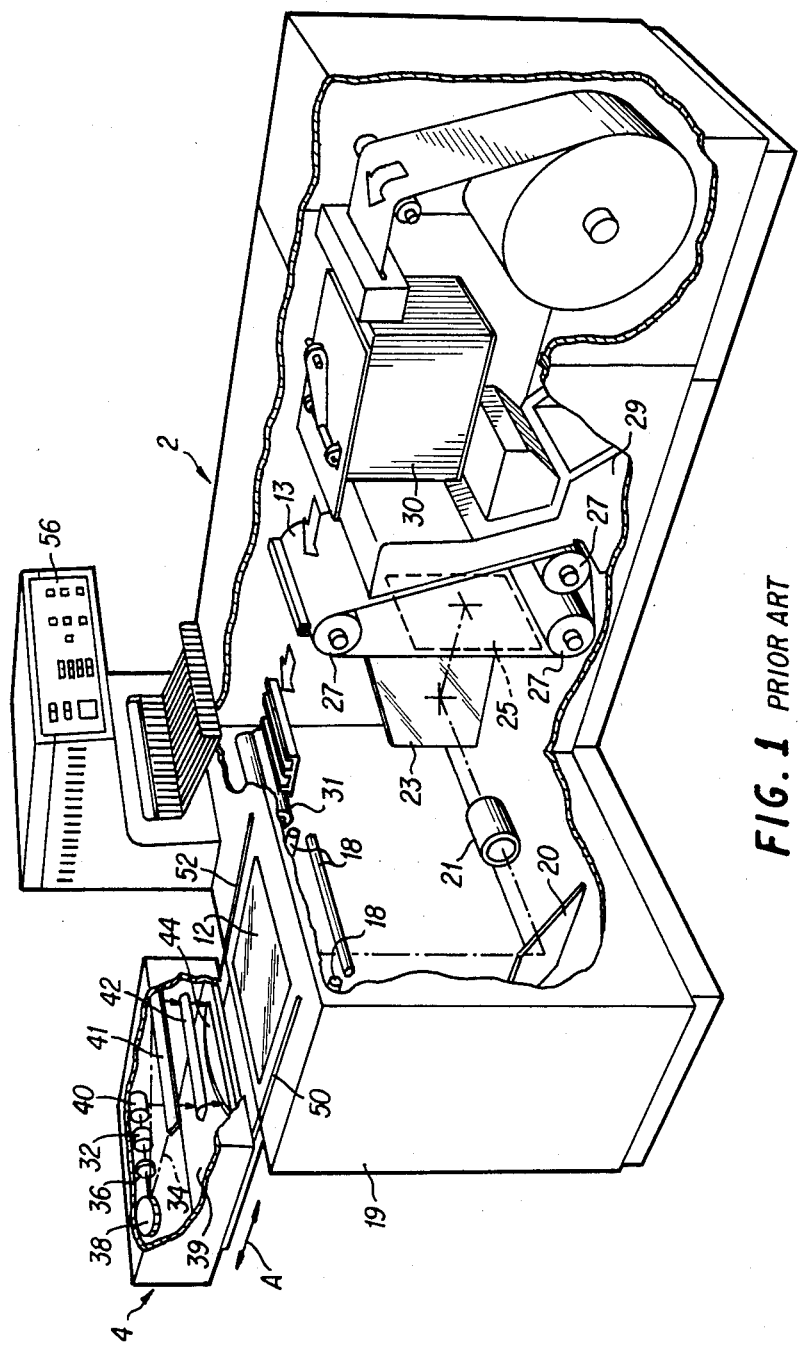

United States Patent [19]

Carley

[11] Patent Number: 4,575,214

[45] Date of Patent: Mar. 11, 1986

[54] COPIER/LASER-PRINTER CONVERSION

[76] Inventor: Adam L. Carley, 5 Westside Dr., Atkinson, N.H. 03811

[21] Appl. No.: 510,553

[22] Filed: Jul. 5, 1983

[51] Int. Cl.⁴ ................... G03G 15/00; G03G 15/28
[52] U.S. Cl. .................................. 355/3 R; 355/8; 355/14 R
[58] Field of Search ............... 355/3 R, 14 R, 14 E, 355/20, 46, 75, 8, 1; 358/300

[56] References Cited

U.S. PATENT DOCUMENTS

| | | | |
|---|---|---|---|
| 4,027,961 | 6/1977 | Starkweather | 355/3 R |
| 4,046,471 | 9/1977 | Branham et al. | 355/14 R |
| 4,327,990 | 5/1982 | Tago | 355/14 E X |
| 4,355,882 | 10/1982 | Snelling | 355/14 R X |
| 4,387,983 | 6/1983 | Masegi | 355/14 E X |

Primary Examiner—A. C. Prescott

[57] ABSTRACT

A method of converting existing copiers to laser printer engines by externally attaching an apparatus to the copier with no significant alteration of the copier engine, and attachable in an easily removable manner. The apparatus consists of a laser together with an optical system having means for modulating and scanning the laser beam, which enters the copier and passes through the copier's existing imaging lens. The apparatus incorporates a specially designed field mirror that simplifies that optical system.

11 Claims, 2 Drawing Figures

COPIER/LASER-PRINTER CONVERSION

This invention relates to a method to externally attach an apparatus to a copier and convert it to operation as a laser printer.

DISCUSSION OF PRIOR ART

Laser printers generally consist of a xerographic-type copier "engine" which has been redesigned and reengineered to incorporate internally a laser and associated optics/electronics to form a laser printer. Such internal redesigns are costly and generally result in (a) only certain copier models becoming available as laser printers, (b) only copier manufacturers being in a position to manufacturer laser printers, (c) a substantial delay between a copier engine's availability as a copier and its availability as a laser printer and (d) an inability to utilize existing copier service personnel without additional training.

Starkweather (U.S. Pat. No. 4,027,961) describes a particular apparatus configured to operate either in a copier mode or as a laser printer. In this configuration, the apparatus incorporates two units that are inseperable, a copier unit and an optical unit. The latter is mounted so as to be movable from the top of the copier engine to another position attached to the copier. No discussion or claim is presented for the use of the optical unit to convert an existing copier to a laser printer or for its use with a plurality of copier models. Additionally the operation of the Starkweather laser printer, as claimed, would appear to be in question, since the scan of the laser beam is shown parallel to the motion of the photoreceptor belt. The optical unit includes a lens to project the light beam onto the copier document glass, specified as a field lens.

OBJECTS

It is an object of my invention to provide an apparatus that can be externally attached to a copier to convert it to a laser printer. It is a further object that the apparatus be easily and quickly removed and the copier restored to an unaltered state. It is a further object that attachment of the apparatus to a copier requires no significant alteration to the copier and so will not invalidate copier service contracts. It is a further object that one such apparatus or a small number of such apparatuses be attachable to many different copier models, utilizing at most a simple interface kit for each different copier model which permits simple attachment to the copier. It is yet a further object to provide a simplified optical system within the apparatus.

Further objects and advantages of my invention will become apparent from a consideration of the drawings and ensuing description thereof.

DRAWINGS

FIG. 1 is the prior art coming closest to my invention. (U.S. Pat. No. 4,027,961, Starkweather, assigned to Xerox Corp.)

Figure 2:
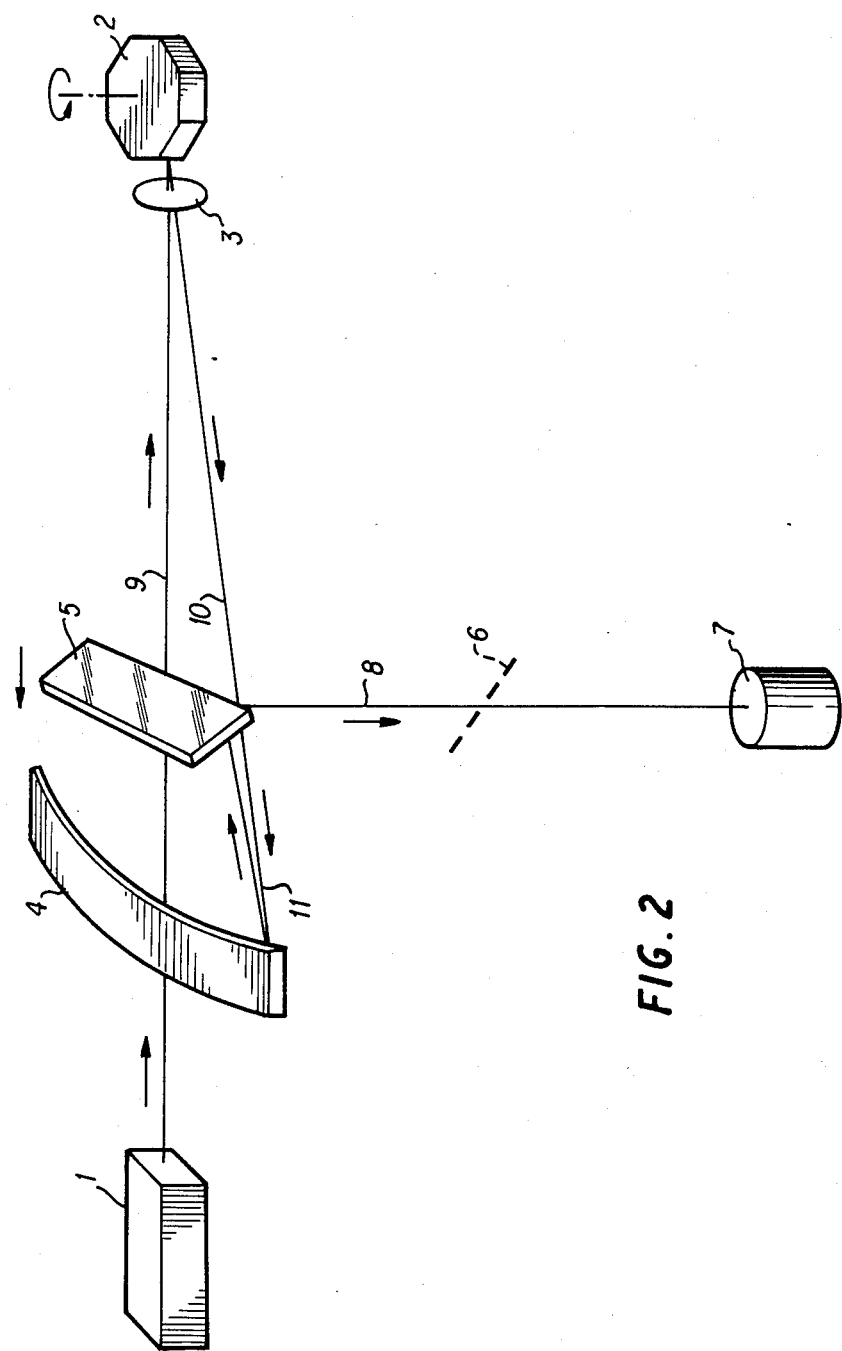

FIG. 2 is a perspective view of the preferred embodiment of my invention.

DESCRIPTION

My invention incorporates an apparatus that is a separate unit including a laser and an optical system and means for modulating the laser beam according to information received and scanning the beam. The apparatus is placed onto a copier engine, and the modulated laser beam from the apparatus is projected from outside the copier engine through the normal lens within the copier engine and thus onto the copier photoreceptor.

FIG. 1 shows a previous art through-the-lens (21) laser printer based on Xerox Corporation's 9000 series copiers. It shows a unit manufactured with and permanently part of the copier which uses large refracting (as opposed to reflecting) optical elements 42 and 44. Mirrors 20 and 23 direct the laser beam onto the photoreceptor 13.

In my invention, FIG. 2, modulated laser 1 consists of a laser and separate laser modulator of the type normally used in laser printers (e.g. a gas laser with an acoustic-optic modulator). Alternatively, item 1 could be a semiconductor laser which combines modulator and laser functions in a single unit, or it could consist of apparatus to produce several modulated laser beams travelling through the system together. Scanner 2 consists of any of the laser scanner types normally used in laser printers. A spinning polygon scanner is shown, but holographic and acoustic-optical types are also available. Various conventional optical elements are represented by 3 which focus the beam, flatten the field, linearize the scan, and/or compensate for scanner defects such as wobble. In my invention a special spherical mirror segment 4, serving as a field lens, is present. Scanner 2 is at the approximate center of spherical mirror segment 4. Plane mirror 5 is fixed at an angle of approximately 45° and may be manually translated in the direction of the arrow to accomodate different copiers. Mirrors 4 and 5 are approximately fourteen inches long, in the case of a 14" scan, with their other dimensions only being large enough to insure mechanical stability and to include the diameter of the focussed laser beam.

Copier lens 7 and typical copier folding mirror 6 are part of the copier, not my apparatus. For clarity, the beam is not shown folded by mirror 6.

OPERATION

In prior art FIG.1, certain elements operate in a manner similar to my invention and most other laser printers. They are laser 40, modulator 32, focussing optics 36, scanner 38 and 45° mirror 41. However, unlike other laser printer prior art, Startweather incorporates a field lens 44 and associated optical arrangement. This is necessary because conventional laser-printer optics cannot be operated extenally to the copier . . . the beam paths would diverge out of the scanner and most paths would not pass through the copy lens and would be lost. A field lens is a lens at or near an image plane whose function is to redirect off-axis rays into subsequent optics rather than to add optical power. In a laser printer, such a lens must be (approxiamtely) as large as a sheet of paper in one dimension and is not to be confused with so-called f-theta lenses which flatten the field and linearize the scan. However, it will be noted that prior art field lens 44 follows, not precedes, mirror 41 and is a large glass lens, not a mirror. This glass lens will have to be larger than shown, will require internal clarity, and cause light losses at its surfaces. The inventor recognizes that his "filed lens can have a multi-element structure" (col. 4, line 12) further increasing its complexity.

It will be noted throughout the Starkweather/Xerox patent that the inventor conceives of his laser unit and copier as a single co-manufactured apparatus and has not contemplated that laser units be attached to pre-existing copiers to convert them to laser printers, or to different copier models. Such use is the purpose of my invention.

Attention is also called to the direction of scan in Starkweather/Xerox. While the direction of scan is not stated in the patent text, it is clearly shown in FIG. 1. Although initially perpendicular to belt motion 13, the scan becomes essentially parallel to that belt motion after being acted on by mirrors 20 and 23 and lens 21. The parallel scan of Starkweather would produce highly unsatisfactory results, illuminating only a small portion of the photoreceptor 13, and thus will not operate as claimed.

For these and other reasons, it will be noted that Xerox Corporation did not use its Starkweather patent when it actually designed laser printers based on its 9000 and 8000 series copiers, producing instead laser-printer models 9700 and 8700 which utilize conventional internal laser systems. In the following discussion of my invention, "conventional" refers to laser systems actually used, not the Starkweather patent.

FIG. 2 shows the essential optical features of my copier attachment. Beam-folding mirrors will make it more compact than shown, but are omitted for clarity. The unit is placed such that the copier's document glass (not shown) is located just below mirror 5. The document glass is easily removed from most copiers and may be so-removed for added clarity of image. However, it is not necessary that the glass be removed for my invention to operate. The optical apparatus shown, and some of its electronics, is appropriately encased so that it may be set on the copier to allow laser beams 8 coming off mirror 5 to pass through a slit or window on the bottom of my apparatus.

Temporary electrical connections to the copier would normally be required for synchronism, as well as temporary disablement of the copier's document illumination system. However, it is also possible to have no internal connections to the copier and external sensors and button-pushing solenoids could be used. The copier's illumination system could be blinded by blackening the bottom of my apparatus instead of disabling the illumination system.

The apparatus is securely mounted on the copier by means such as clamps or vacuum pods or just by gravity. It need be no more or less stable than if it were a document being copied, but must not "walk" under continual use.

In some cases it will be desirable to use the copier as a normal copier interchangably with laser-printer operation. For copier use, the apparatus is simply lifted and removed from the copier. Alternatively, no movement of the apparatus is needed on certain machines. On such machines, mirror 5 is positioned so that the laser beam enters onto the small dead space just off the side of the copier's document area which is still imaged by the copier lens but not normally used. Then documents can be copied without moving the apparatus aside by simply inserting them in area 9. Documents can also be superimposed with laser-printer information by this means.

My apparatus is positioned on the copier so that the direction of scan, i.e. the lengthwise direction of mirror 5, is essentially perpendicular to the direction of photoreceptor movement as seen through the optical system of the copier, including 6 and 7. On Xerox 8000 and 9000 series copiers that is 90° different from the direction shown in FIG. 1.

The scanner 2 provides scanning in one dimension while the motion of the photoreceptor 13 provides scanning in the other dimension. For strobe-illumination copiers, such as the Xerox 8200, no further copier modification is required. However many copiers, such as those using drums, mechanically scan the original, rather than strobing it by moving the document glass, the lens 7, and/or internal mirrors such as 6. Copiers with such scanning mechanisms must be examined on a case-by-case basis and certain copiers will prove difficult to convert with my apparatus. However, most such mechanisms can be disabled easily by removing a part from the drive mechanism such as a pin or setscrew, or similar action, and a tool to perform this disablement would be part of the installation kit for a given copier. Once these reciprocating parts are disabled (frozen) these copiers will take my apparatus just like a strobe-type copier. For example, the curved-glass Xerox 3600-series copiers use a reciprocating mirror 6 which can be harmlessly jammed into the extreme retrace position to disable the scan. This procedure takes just seconds to do, or undo, with the proper tool.

Refering now to the internal optical parts of FIG. 2, modulated laser beam 1, scanner 2, and lenses 3 perform operations identical to conventional laser-printer systems. The beam is shown passing through lens 3 twice for schematic purposes only. Typically several lenses, both before and after the scanner, are used. Unlike conventional laser printers, any field-flattening performed by lenses 3 would be of the opposite sign to that normally used, having shorter focal length at the ends of the scan than at the center. The focussing power of lens 3 would vary from one copier to another depending on the distance from copier lens 7 to the copier document glass. That focal length variation would be manually accomplished by inserting or interchanging small lenses or by a zoom lens at position 3. Minimal optical precision is required of such lenses if located before the scanner because the beam is entirely on-axis, narrow aperature, and mono-chromatic. The beam is, of course, brought to a focus at the copier's document glass, or slightly below if that glass is removed.

The purpose of the mirrors 4 and 5 is to direct laser beams from all positions in the scan to pass through the center of copier lens 7. There are numerous ways to perform this function, such as the prior art system shown in FIG. 1. However, my system of FIG. 2 is far superior to previously published systems because there is a single mirror 4 which is spherical, as opposed to more complicated shapes, multiple elements, or refractive elements. It is this improvement that makes my system practical vis-a-vis the Starkweather system. Both the scanner face 2 and the image of the copier lens 7 as seen in mirror 5, are placed near the center of the sphere defined by mirror 4. This is accomplished in the face of a variety of copier geometries by making mirror 5 manually adjustable to accomodate different copiers.

For larger production quantities, mirror 4 can be made of molded plastic coated with a reflective film, in which case it is no longer important that it be spherical. In that case, it is no longer a constraint that incoming and outgoing beams 11 be close together, for example with an ellipsoidal mirror, and it might be easier for mirror 4 to be manually replaced from copier to copier instead of, or in addition to, moving mirror 5. The length of the scan, which one might desire to be as short as 8.5" on some copiers and as long as 14" on others, can be set arbitrarily if mirror 4 and mirror 5 are both changed along with lens 3 whenever the unit is installed on a different copier model.

In the case of an ellipsoidal mirror 4, one focus of the ellipsoid would be at the scanner and the other at the image of the copier lens 7. In order for the scan on the photoreceptor to be a straight line and not curved, the plane of the segment 4 must include the image of the copier lens 7. If the incoming beams 11 to mirror 4 are also in that plane, then both ellipsoid focii are in the plane of mirror 4. On the other hand, if it is desired that incoming and outgoing beams 11 be significantly vertically separate, for example to provide clearance for mirror 5, then the lens system 3 must include correction to provide out-of-plane deflection of the scan. Such non-planar scan can also be provided by operating the scanner with its incoming beam not perpendicular to its spin axis. This latter method allows separation of incoming and outcoming beams at the scanner, simplifying the design of lens 3.

While the above description contains many specificities, these should not be construed as limitations on the scope of the invention, but rather as an exemplification of one preferred embodiment thereof. Many other variations are possible. Accordingly, the scope of the invention should be determined not by the embodiment illustrated, but by the appended claims and their legal equivalents.

I claim:

1. A method of reversibly converting a pre-existing copier to a laser printer comprising:
   (a) placing a laser-optical apparatus providing a scanned and modulated laser beam, and a field lens converging the beam paths, external to the copier;
   (b) orienting the laser-optical apparatus so that its laser beams pass through the copier's existing imaging lens;
   (c) further orienting the laser-optical apparatus so that its direction of scan across the copier's photoreceptor is substantially perpendicular to the direction of motion of that photoreceptor; and
   (d) electronically controlling the laser-optical apparatus to form images in synchronism with photoreceptor and paper movement in the copier.

2. The method of claim 1 where the field lens is reflecting.

3. The method of claim 2 where said reflecting field lens is concave and a segment of a sphere.

4. The method of claim 2 where said reflecting field lens is concave and a segment of an ellipsoid.

5. The method of claim 4 where said ellipsoidal segment is preceded by a correction lens providing out-of-plane deflection of the scan.

6. The method of claim 1 where the laser-optical apparatus may be used with a plurality of copier models by adjusting and/or replacing selected components within it and by providing an interface kit to permit attachment to each copier model.

7. The method of claim 1 plus the further step of disabling at least part of the document scanning mechanism within the copier.

8. The method of claim 1 plus the additional step of removing the copier document glass for added image clarity.

9. The method of claim 1 plus the additional step of covering the copier document area with a blackened material except for a narrow portion to allow entry of the laser beam.

10. The method of claim 1 where the laser-optical system is positioned so that the laser beams enter just off the copier's normal document input area but still within the field-of-view of the copier's optics.

11. The method of claim 1 where the laser is replaced by multiple lasers.

* * * * *